United States Patent
Asano et al.

(10) Patent No.: US 11,498,849 B2
(45) Date of Patent: *Nov. 15, 2022

(54) SOLID ELECTROLYTE MATERIAL AND BATTERY

(71) Applicant: Panasonic Intellectual Property Management Co., Ltd., Osaka (JP)

(72) Inventors: Tetsuya Asano, Nara (JP); Akihiro Sakai, Nara (JP); Yusuke Nishio, Osaka (JP); Masashi Sakaida, Hyogo (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 208 days.

This patent is subject to a terminal disclaimer.

(21) Appl. No.: 16/911,707

(22) Filed: Jun. 25, 2020

(65) Prior Publication Data

US 2020/0328460 A1    Oct. 15, 2020

Related U.S. Application Data (63) Continuation of application No. PCT/JP2018/046258, filed on Dec. 17, 2018.

(30) Foreign Application Priority Data

Jan. 5, 2018  (JP) .............................. JP2018-000425

(51) Int. Cl.
*H01M 10/0562* (2010.01)
*C01F 17/36* (2020.01)

(52) U.S. Cl.
CPC .......... *C01F 17/36* (2020.01); *H01M 10/0562* (2013.01); *H01M 2300/008* (2013.01)

(58) Field of Classification Search
None
See application file for complete search history.

(56) References Cited

U.S. PATENT DOCUMENTS 4,352,869 A   10/1982  Mellors
5,506,073 A    4/1996  Angell et al.
(Continued)

FOREIGN PATENT DOCUMENTS

CN   105254184 A   1/2016
CN   105680048 A   6/2016
(Continued)

OTHER PUBLICATIONS

International Search Report of International Application No. PCT/JP2018/043363 dated Feb. 19, 2019.
(Continued)

*Primary Examiner* — Christopher P Domone
(74) *Attorney, Agent, or Firm* — McDermott Will & Emery LLP (57) ABSTRACT

A solid electrolyte material contains Li, Y, at least one selected from the group consisting of Mg, Ca, Sr, Ba, Zn, Sc, La, Sm, Bi, Zr, Hf, Nb, and Ta, and at least one selected from the group consisting of Cl, Br, and I. An X-ray diffraction pattern of the solid electrolyte material obtained by using Cu-Kα radiation as the X-ray source includes peaks within the range in which the diffraction angle 2θ is 25° or more and 35° or less, and also includes at least one peak within the range in which the diffraction angle 2θ is 43° or more and 51° or less.

10 Claims, 6 Drawing Sheets

(56) References Cited

U.S. PATENT DOCUMENTS

| | | |
|---|---|---|
| 5,714,279 A | 2/1998 | Zajac, Jr. et al. |
| 9,160,034 B2 | 10/2015 | Kato et al. |
| 10,008,735 B2 | 6/2018 | Ohtomo et al. |
| 2004/0151986 A1 | 8/2004 | Park et al. |
| 2011/0045355 A1 | 2/2011 | Ichikawa |
| 2012/0301796 A1 | 11/2012 | Ohtomo et al. |
| 2012/0308900 A1 | 12/2012 | Ogasa |
| 2013/0295464 A1 | 11/2013 | Yanagi et al. |
| 2015/0147659 A1 | 5/2015 | Kato |
| 2016/0103232 A1 | 4/2016 | Ouspenski et al. |
| 2016/0149259 A1 | 5/2016 | Osada et al. |
| 2016/0156064 A1 | 6/2016 | Miyashita et al. |
| 2016/0204467 A1 | 7/2016 | Nogami et al. |
| 2016/0248119 A1 | 8/2016 | Kato |
| 2016/0268630 A1 | 9/2016 | Tsukada et al. |
| 2016/0285078 A1 | 9/2016 | Deschamps et al. |
| 2016/0308210 A1 | 10/2016 | Sakuda et al. |
| 2016/0359193 A1 | 12/2016 | Yi et al. |
| 2017/0040637 A1 | 2/2017 | Ceder et al. |
| 2017/0179481 A1 | 6/2017 | Yamada et al. |
| 2017/0187066 A1 | 6/2017 | Tsujimura et al. |
| 2017/0222257 A1 | 8/2017 | Miyashita et al. |
| 2017/0229734 A1* | 8/2017 | Furukawa ........... H01M 4/0414 |
| 2017/0288281 A1 | 10/2017 | Chiang et al. |
| 2018/0183065 A1 | 6/2018 | Sasaki |
| 2018/0269521 A1 | 9/2018 | Ohtomo et al. |
| 2019/0067736 A1 | 2/2019 | Yoshioka et al. |
| 2019/0088995 A1 | 3/2019 | Asano et al. |
| 2019/0097266 A1 | 3/2019 | Yamamoto et al. |
| 2020/0212481 A1 | 7/2020 | Nagamine et al. |
| 2020/0328454 A1 | 10/2020 | Sakai et al. |
| 2020/0328455 A1 | 10/2020 | Sakai et al. |
| 2020/0328457 A1 | 10/2020 | Sakai et al. |
| 2020/0328461 A1 | 10/2020 | Asano et al. |
| 2020/0328462 A1 | 10/2020 | Asano et al. |
| 2020/0328464 A1 | 10/2020 | Asano et al. |
| 2020/0328465 A1 | 10/2020 | Sakaida et al. |
| 2020/0328468 A1 | 10/2020 | Sakaida et al. |
| 2020/0328469 A1 | 10/2020 | Asano et al. |
| 2020/0335817 A1 | 10/2020 | Asano et al. |
| 2020/0350615 A1 | 11/2020 | Sakaida et al. |
| 2020/0350622 A1 | 11/2020 | Sakaida et al. |

FOREIGN PATENT DOCUMENTS

| | | |
|---|---|---|
| CN | 108701860 A | 10/2018 |
| EP | 2916381 B1 | 6/2016 |
| EP | 3428929 A1 | 1/2019 |
| EP | 3496202 A1 | 6/2019 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | 11-238528 A | 8/1999 |
| JP | 2001-052733 A | 2/2001 |
| JP | 2004-235155 A | 8/2004 |
| JP | 2006-244734 A | 9/2006 |
| JP | 2008-021556 A | 1/2008 |
| JP | 2011-129312 | 6/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-117753 A | 6/2017 |
| JP | 2017-518622 A | 7/2017 |
| JP | 2017-152324 A | 8/2017 |
| JP | 6222134 B2 | 11/2017 |
| JP | 2017-224474 A | 12/2017 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2017/108105 A1 | 6/2017 |
| WO | 2017/154766 A1 | 9/2017 |
| WO | 2017/154922 A1 | 9/2017 |
| WO | 2018/025582 A1 | 2/2018 |
| WO | 2019/146218 A1 | 8/2019 |
| WO | 2019/146219 A1 | 8/2019 |

OTHER PUBLICATIONS

International Search Report of International Application No. PCT/JP2018/041893 dated Feb. 19, 2019.

International Search Report of International Application No. PCT/JP2018/041892 dated Feb. 19, 2019.

International Search Report of International Application No. PCT/JP2018/041894 dated Feb. 19, 2019.

International Search Report of International Application No. PCT/JP2018/046259 dated Mar. 12, 2019.

International Search Report of International Application No. PCT/JP2018/046260 dated Mar. 12, 2019.

International Search Report of International Application No. PCT/JP2018/046262 dated Mar. 19, 2019.

International Search Report of International Application No. PCT/JP2018/041900 dated Feb. 19, 2019.

International Search Report of International Application No. PCT/JP2018/041897 dated Feb. 19, 2019.

International Search Report of International Application No. PCT/JP2018/046263 dated Mar. 19, 2019.

International Search Report of International Application No. PCT/JP2018/046264 dated Mar. 19, 2019.

International Search Report of International Application No. PCT/JP2018/042061 dated Feb. 19, 2019.

International Search Report of International Application No. PCT/JP2018/042062 dated Feb. 19, 2019.

Yasumasa Tomita et al., "Lithium ion conductivity of Li3InBr6 doped with different element", Denka Chemical Society 70th Anniversary Conference Abstracts, Mar. 25, 2003, p. 384; with English translation.

Yasumasa Tomita et al., "Preparation of Substituted Compounds of Lithium Indium Bromide and Fabrication of All Solid-State battery", Recent Innovations in Chemical Engineering, 2017, 10, 12-17.

The Extended European Search Report dated Jan. 29, 2021 for the related European Patent Application No. 18898666.5.

The Extended European Search Report dated Feb. 5, 2021 for the related European Patent Application No. 18898795.2.

The Extended European Search Report dated Feb. 9, 2021 for the related European Patent Application No. 18898242.5.

The Extended European Search Report dated Feb. 9, 2021 for the related European Patent Application No. 18898043.7.

The Extended European Search Report dated Feb. 9, 2021 for the related European Patent Application No. 18998663.2.

The Extended European Search Report dated Feb. 9, 2021 for the related European Patent Application No. 18898873.7.

The Extended European Search Report dated Feb. 9, 2021 for the related European Patent Application No. 18898935.4.

The Extended European Search Report dated Feb. 9, 2021 for the related European Patent Application No. 18902720.4.

The Extended European Search Report dated Feb. 9, 2021 for the related European Patent Application No. 18898525.3.

The Extended European Search Report dated Feb. 10, 2021 for the related European Patent Application No. 18898462.9.

The Extended European Search Report dated Feb. 15, 2021 for the related European Patent Application No. 18898524.6.

(56) References Cited

OTHER PUBLICATIONS

Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Mar. 28, 2022 for the related Indian Patent Application No. 202047027797.
Indian Examination Report dated Apr. 4, 2022 for the related Indian Patent Application No. 202047027476.
International Search Report of PCT application No. PCT/JP2018/046258 dated Feb. 5, 2019.
Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICl6 (Ml = Li, Na, Ag; MIII= In, Y)." Zeitschrift fur anorganhische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M = Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.

\* cited by examiner

SOLID ELECTROLYTE MATERIAL AND BATTERY

BACKGROUND

1. Technical Field

The present disclosure relates to solid electrolyte materials and batteries.

2. Description of the Related Art

Japanese Unexamined Patent Application Publication No. 2011-129312 discloses an all-solid-state battery made with a sulfide solid electrolyte.

Z. Anorg. Allg. Chem. 623 (1997), 1067-1073 (NPL 1) discloses $Li_3YCl_6$.

Z. Anorg. Allg. Chem. 623 (1997), 1352-1356 (NPL 2) discloses $Li_3YBr_6$.

SUMMARY

In one general aspect, the techniques disclosed here feature a solid electrolyte material. The solid electrolyte material contains Li, Y, at least one selected from the group consisting of Mg, Ca, Sr, Ba, Zn, Sc, La, Sm, Bi, Zr, Hf, Nb, and Ta, and at least one selected from the group consisting of Cl, Br, and I. An X-ray diffraction pattern of the solid electrolyte material obtained by using Cu-Kα radiation as the X-ray source includes peaks within the range in which the diffraction angle 2θ is 25° or more and 35° or less, and includes at least one peak within the range in which the diffraction angle 2θ is 43° or more and 51° or less.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the following, embodiments of the present disclosure are described with reference to drawings.

Embodiment 1

A solid electrolyte material in Embodiment 1 is a material composed of Li, Y, M, and X.

M is at least one selected from the group consisting of Mg, Ca, Sr, Ba, Zn, Sc, La, Sm, Bi, Zr, Hf, Nb, and Ta.

X is at least one selected from the group consisting of Cl, Br, and I.

An X-ray diffraction pattern of the solid electrolyte material in Embodiment 1 obtained by using Cu-Kα radiation as the X-ray source includes peaks within the range in which the diffraction angle 2θ is 25° or more and 35° or less, and includes at least one peak within the range in which the diffraction angle 2θ is 43° or more and 51° or less.

This configuration helps realize a halide solid electrolyte material, which is a solid electrolyte material highly conductive to lithium ions.

This configuration, furthermore, helps realize an all-solid-state secondary battery superior in charge and discharge characteristics through the use of the solid electrolyte material in Embodiment 1.

Through the use of the solid electrolyte material in Embodiment 1, moreover, a sulfur-free all-solid-state secondary battery is realized. That is, the configuration of the solid electrolyte material in Embodiment 1 is not one that produces hydrogen sulfide when exposed to the air (e.g., the configuration in Japanese Unexamined Patent Application Publication No. 2011-129312). The use of the material therefore helps realize an all-solid-state secondary battery that produces no hydrogen sulfide and therefore is superior in safety.

The X-ray diffraction pattern of the solid electrolyte material in Embodiment 1 may include two peaks within the range in which the diffraction angle 2θ is 50° or more and 63° or less.

This configuration helps realize a solid electrolyte material more conductive to lithium ions.

The X-ray diffraction pattern of the solid electrolyte material in Embodiment 1 may include a peak within the range in which the diffraction angle 2θ is 13° or more and 18° or less.

This configuration helps realize a solid electrolyte material more conductive to lithium ions.

It should be noted that "there are two peaks within a particular range (e.g., the range in which the diffraction angle 2θ is 25° or more and 35° or less or 50° or more and 63° or less)" as stated herein includes the meaning that "there are two distinctive peaks within the particular range."

"Distinctive" means that when the positions of the two peaks are defined as $2θ_1$ and $2θ_2$ and the full widths at half maximum as $2Δθ_1$ and $2Δθ_2$, at least the following is satisfied: $|2θ_2-2θ_1|>(2Δθ_1+2Δθ_2)$.

The solid electrolyte material in Embodiment 1 may include a first crystal phase. An example of a first crystal phase is a crystal phase that gives a characteristic diffraction pattern as described above.

If the measured intensity is not sufficiently high, the pattern may lack a subset of the peaks.

A first crystal phase that gives a characteristic diffraction diagram as described above is not limited to a particular crystal structure, but examples include crystal structures like those described below.

One is a structure in which the anion sublattice framework is a cubic close-packed (face-centered cubic) or distorted cubic close-packed (face-centered cubic) atomic arrangement. That is, in an anion sublattice, each anion is coordinated to by twelve other anions. The interior angles of the triangle formed by the closest two of these twelve anions and the central anion are all approximately 60°. More specifically, the interior angles of this triangle fall within the range of approximately 60°±5°.

An example of such a structure is the $Li_3ErBr_6$ (hereinafter also denoted as LEB) system, which has a crystal structure that belongs to the space group C2/m. Its detailed atomic arrangement is found in the Inorganic Crystal Structure Database (ICSD) (ICSD No. 50182). Other examples include spinel and inverse spinel structures, which belong to the space group Fd-3m, Imma, etc.

The solid electrolyte material in Embodiment 1 may include an extra crystal phase, a crystal phase that has a crystal structure that is not a first crystal phase.

This configuration helps realize a solid electrolyte material more conductive to lithium ions. Specifically, it seems that when the solid electrolyte material has a crystal structure like a first crystal phase, anions are attracted to the vicinity of Y or M more strongly, and at the same time M and Y are mixed together, creating regions in which the potential of Li ions is unstable. This creates a pathway for lithium ions to diffuse through. The Li-depleted composition, moreover, means that unoccupied site(s) is created, making the crystal more conductive to lithium ions. As a result, the inventors believe, the material's lithium ion conductivity is further improved.

The solid electrolyte material in Embodiment 1, moreover, can be in any shape, such as acicular, spherical, or ellipsoidal. For example, the solid electrolyte material in Embodiment 1 may be particles. Multiple particles may be stacked and then compressed to form pellets or sheets.

If the solid electrolyte material in Embodiment 1 has a particle shape (e.g., spherical), its median diameter may be 0.1 μm or more and 100 μm or less.

In Embodiment 1, furthermore, the median diameter may be 0.5 μm or more and 10 μm or less.

This configuration helps further increase ionic conductivity, and also allows the solid electrolyte material in Embodiment 1 to form a better dispersion state, for example with an active material.

In Embodiment 1, furthermore, the solid electrolyte material may be smaller than the median diameter of an active material.

This configuration allows the solid electrolyte material in Embodiment 1 to form a better dispersion state, for example with an active material.

Embodiment 2

In the following, Embodiment 2 is described. Any details that have already been described in Embodiment 1 above are omitted where appropriate.

A solid electrolyte material in Embodiment 2 is a material composed of Li, Y, M, and X.

M is at least one selected from the group consisting of Mg, Ca, Sr, Ba, Zn, Sc, La, Sm, Bi, Zr, Hf, Nb, and Ta.

X is at least one selected from the group consisting of Cl, Br, and I.

A first converted pattern, which is obtained by measuring an X-ray diffraction pattern of the solid electrolyte material in Embodiment 2 by using Cu-Kα radiation as the X-ray source and converting the X-ray diffraction pattern to change its horizontal axis from the diffraction angle 2θ to q, where $q=4\pi \sin\theta/\lambda$, where λ is the wavelength of the Cu-Kα radiation, includes its base peak within the range in which q is 1.76 Å$^{-1}$ or more and 2.18 Å$^{-1}$ or less. A second converted pattern, which is obtained by converting the X-ray diffraction pattern to change its horizontal axis from the diffraction angle 2θ to $q/q_0$, where $q_0$ is the q corresponding to the base peak in the first converted pattern, includes a peak within each of the range in which $q/q_0$ is 1.14 or more and 1.17 or less and the range in which $q/q_0$ is 1.62 or more and 1.65 or less.

This configuration helps realize a halide solid electrolyte material, which is a solid electrolyte material highly conductive to lithium ions.

This configuration, furthermore, helps realize an all-solid-state secondary battery superior in charge and discharge characteristics through the use of the solid electrolyte material in Embodiment 2.

Through the use of the solid electrolyte material in Embodiment 2, moreover, a sulfur-free all-solid-state secondary battery is realized. That is, the configuration of the solid electrolyte material in Embodiment 2 is not one that produces hydrogen sulfide when exposed to the air (e.g., the configuration in Japanese Unexamined Patent Application Publication No. 2011-129312). The use of the material therefore helps realize an all-solid-state secondary battery that produces no hydrogen sulfide and therefore is superior in safety.

The second converted pattern may include a peak within each of the range in which $q/q_0$ is 1.88 or more and 1.94 or less and the range in which $q/q_0$ is 1.9 or more and 2.1 or less.

This configuration helps realize a solid electrolyte material more conductive to lithium ions.

The second converted pattern may include a peak within the range in which $q/q_0$ is 0.49 or more and 0.56 or less.

This configuration helps realize a solid electrolyte material more conductive to lithium ions.

The solid electrolyte material in Embodiment 2, as in Embodiment 1, may include a first crystal phase.

An example of a first crystal phase is a crystal phase that gives a characteristic converted pattern as described above.

If the measured intensity is not sufficiently high, the pattern may lack a subset of the peaks.

The solid electrolyte material in Embodiment 2 may include an extra crystal phase, a crystal phase that has a crystal structure that is not a first crystal phase.

The notation "the range in which particular parameter A is value B to value C" herein refers to "the range in which B≤A≤C."

Method for Producing a Solid Electrolyte Material

A solid electrolyte material in Embodiment 1 or 2 can be produced by, for example, the following method.

Raw-material powders of binary halides are prepared to give the intended constitutive elements. For example, if a solid electrolyte material that contains Li, Y, Sr, and Br is produced, LiBr, YBr$_3$, and SrBr$_2$ are prepared. By selecting the types of the raw-material powders, the anionic composition can be determined. After the raw-material powders are mixed together well, the raw-material powders are mixed, milled, and allowed to react by the method of mechanochemical milling. The mixture may then be fired in a vacuum or inert atmosphere. Alternatively, the raw-material powders may be fired in a vacuum or inert atmosphere after being mixed together well. The firing conditions can be, for example, a temperature within the range of 100° C. to 650° C. and at least 1 hour of firing.

This gives a solid electrolyte material that includes a composition as described above.

The types and crystal structure of crystal phases in the solid electrolyte material and the positions of peaks in the X-ray diffraction pattern using Cu-Kα as the radiation source and in converted patterns can be determined by adjusting the percentages of raw materials and customizing the method and parameters for the reaction between the raw-material powders.

Embodiment 3

In the following, Embodiment 3 is described. Any details that have already been described in Embodiment 1 or 2 above are omitted where appropriate.

A battery in Embodiment 3 is made with a solid electrolyte material described in Embodiment 1 or 2 above.

The battery in Embodiment 3 includes a solid electrolyte material, a positive electrode, a negative electrode, and an electrolyte layer.

The electrolyte layer is a layer placed between the positive and negative electrodes.

At least one of the positive electrode, electrolyte layer, and negative electrode contains a solid electrolyte material in Embodiment 1 or 2.

This configuration helps improve the charge and discharge characteristics of a battery.

In the following, a specific example of a battery in Embodiment 3 is described.

Figure 1:
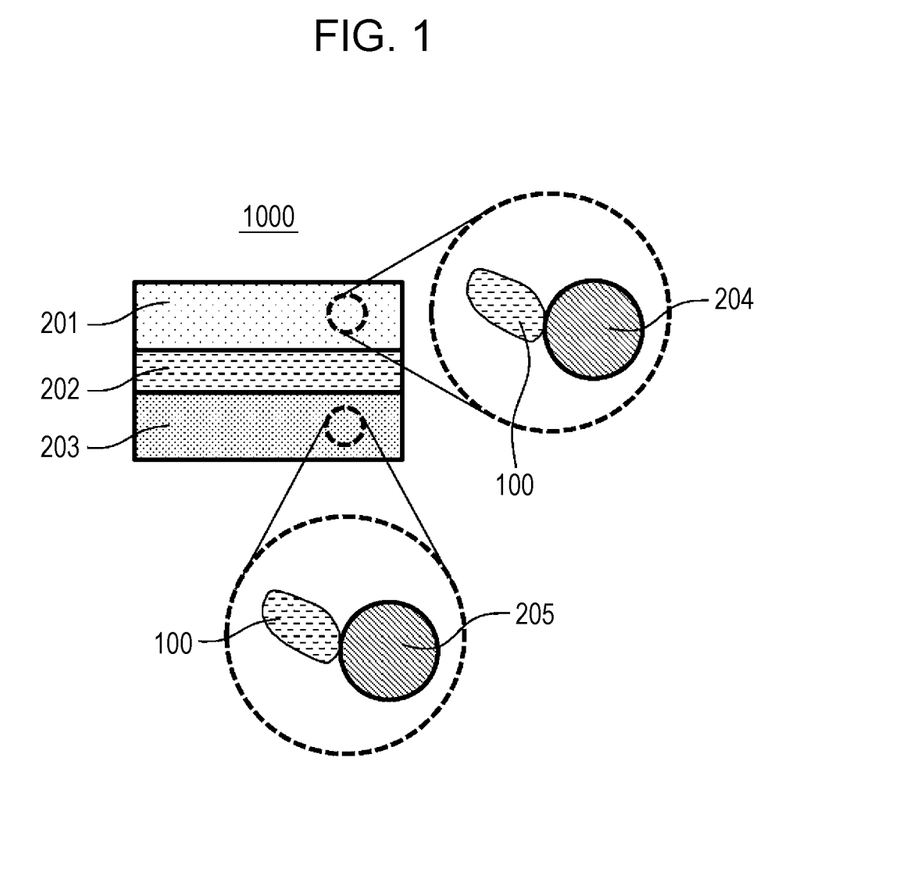
FIG. 1 is a cross-sectional diagram that illustrates a schematic structure of a battery in Embodiment 3.

FIG. 1 is a cross-sectional diagram that illustrates a schematic structure of a battery 1000 in Embodiment 3.

The battery 1000 in Embodiment 3 includes a positive electrode 201, a negative electrode 203, and an electrolyte layer 202.

The positive electrode 201 contains positive electrode active material particles 204 and solid electrolyte particles 100.

The electrolyte layer 202 is placed between the positive electrode 201 and the negative electrode 203.

The electrolyte layer 202 contains an electrolyte material (e.g., a solid electrolyte material).

The negative electrode 203 contains negative electrode active material particles 205 and solid electrolyte particles 100.

The solid electrolyte particles 100 are particles of a solid electrolyte material in Embodiment 1 or 2 or particles that contain a solid electrolyte material in Embodiment 1 or 2 as their primary ingredient.

The positive electrode 201 contains a material that has a tendency to store and release metal ions (e.g., lithium ions). The positive electrode 201 contains, for example, a positive electrode active material (e.g., positive electrode active material particles 204).

The positive electrode active material can be, for example, a lithium-containing transition metal oxide (e.g., $Li(NiCoAl)O_2$ or $LiCoO_2$), a transition metal fluoride, a polyanion or fluorinated polyanion material, a transition metal sulfide, a transition metal oxyfluoride, a transition metal oxysulfide, or a transition metal oxynitride.

The median diameter of the positive electrode active material particles 204 may be 0.1 µm or more and 100 µm or less. If the median diameter of the positive electrode active material particles 204 is smaller than 0.1 µm, the positive electrode active material particles 204 and the halide solid electrolyte material can fail to form a good dispersion state in the positive electrode. This affects the charge and discharge characteristics of the battery. If the median diameter of the positive electrode active material particles 204 is larger than 100 µm, lithium diffusion inside the positive electrode active material particles 204 is slow. High-power operation of the battery can therefore be difficult.

The median diameter of the positive electrode active material particles 204 may be larger than that of the halide solid electrolyte material. This ensures the positive electrode active material particles 204 and the halide solid electrolyte material will form a good dispersion state.

For the ratio by volume between the positive electrode active material particles 204 and the halide solid electrolyte material "v:100−v" in the positive electrode 201, it may be that $30 \leq v \leq 95$. If $v<30$, it can be difficult to ensure a sufficiently high energy density of the battery. If $v>95$, high-power operation can be difficult.

The thickness of the positive electrode 201 may be 10 µm or more and 500 µm or less. If the thickness of the positive electrode 201 is smaller than 10 µm, it can be difficult to ensure a sufficiently high energy density of the battery. If the thickness of the positive electrode 201 is larger than 500 µm, high-power operation can be difficult.

The electrolyte layer 202 is a layer that contains an electrolyte material. The electrolyte material is, for example, a solid electrolyte material. That is, the electrolyte layer 202 may be a solid electrolyte layer.

A solid electrolyte layer may contain a solid electrolyte material in Embodiment 1 or 2 above as its primary ingredient. That is, a solid electrolyte layer may contain a solid electrolyte material in Embodiment 1 or 2 above in an amount of, for example, 50% or more as a percentage by weight to the whole solid electrolyte layer (50% by weight or more).

This configuration helps further improve the charge and discharge characteristics of the battery.

A solid electrolyte layer, moreover, may contain a solid electrolyte material in Embodiment 1 or 2 above in an amount of, for example, 70% or more as a percentage by weight to the whole solid electrolyte layer (70% by weight or more).

This configuration helps further improve the charge and discharge characteristics of the battery.

It should be noted that a solid electrolyte layer may contain, besides a solid electrolyte material in Embodiment 1 or 2 above as its primary ingredient, inevitable impurities or starting materials used for the synthesis of the solid electrolyte material, by-products, decomposition products, etc.

A solid electrolyte layer, furthermore, may contain a solid electrolyte material in Embodiment 1 or 2 above in an amount of, for example, 100% as a percentage by weight to the whole solid electrolyte layer (100% by weight) excluding impurities that are inevitably mixed in.

This configuration helps further improve the charge and discharge characteristics of the battery.

A solid electrolyte layer, therefore, may be made solely of a solid electrolyte material in Embodiment 1 or 2.

Alternatively, a solid electrolyte layer may be made solely of a solid electrolyte material different from those in Embodiment 1 or 2. The solid electrolyte material different from those in Embodiment 1 or 2 can be, for example, $Li_2MgX_4$, $Li_2FeX_4$, $Li(Al, Ga, In)X_4$, $Li_3(Al, Ga, In)X_6$, LiI, etc. (X: F, Cl, Br, or I).

A solid electrolyte layer may contain a solid electrolyte material in Embodiment 1 or 2 and a solid electrolyte material different from those in Embodiment 1 or 2 above together. In that case, the two materials may be dispersed uniformly. It may be that a layer of a solid electrolyte material in Embodiment 1 or 2 and a layer of a solid electrolyte material different from those in Embodiment 1 or 2 above are arranged in sequence with respect to the direction of stacking of the battery.

The thickness of a solid electrolyte layer may be 1 µm or more and 1000 µm or less. If the thickness of a solid electrolyte layer is smaller than 1 µm, the risk is high of short-circuiting between the positive electrode 201 and the negative electrode 203. If the thickness of a solid electrolyte layer is larger than 1000 µm, high-power operation can be difficult.

The negative electrode 203 contains a material that has a tendency to store and release metal ions (e.g., lithium ions). The negative electrode 203 contains, for example, a negative electrode active material (e.g., negative electrode active material particles 205).

The negative electrode active material can be, for example, a metallic material, carbon material, oxide, nitride, tin compound, or silicon compound. A metallic material can be a pure metal. Alternatively, a metallic material can be an alloy. Examples of metallic materials include materials such as lithium metal and lithium alloys. Examples of carbon materials include materials such as natural graphite, coke, graphitizing carbon, carbon fiber, spherical carbon, artificial graphite, and amorphous carbon. Silicon (Si), tin (Sn), a silicon compound, or tin compound may be used for the sake of capacity per unit volume. The advantage of controlled electrical decomposition provided by the solid electrolyte material in Embodiment 1 or 2 is more prominent when the negative electrode active reacts at a low average potential.

The median diameter of the negative electrode active material particles 205 may be 0.1 µm or more and 100 µm or less. If the median diameter of the negative electrode active material particles 205 is smaller than 0.1 µm, the negative electrode active material particles 205 and the solid electrolyte particles 100 can fail to form a good dispersion state in the negative electrode. This affects the charge and discharge characteristics of the battery. If the median diameter of the negative electrode active material particles 205 is larger than 100 µm, lithium diffusion inside the negative electrode active material particles 205 is slow. High-power operation of the battery can therefore be difficult.

The median diameter of the negative electrode active material particles 205 may be larger than that of the solid electrolyte particles 100. This ensures the negative electrode active material particles 205 and the halide solid electrolyte material will form a good dispersion state.

For the ratio by volume between the negative electrode active material particles 205 and the solid electrolyte particles 100 "v:100−v" in the negative electrode 203, it may be that 30≤v≤95. If v<30, it can be difficult to ensure a sufficiently high energy density of the battery. If v>95, high-power operation can be difficult.

The thickness of the negative electrode 203 may be 10 µm or more and 500 µm or less. If the thickness of the negative electrode is smaller than 10 µm, it can be difficult to ensure a sufficiently high energy density of the battery. If the thickness of the negative electrode is larger than 500 µm, high-power operation can be difficult.

At least one of the positive electrode 201, electrolyte layer 202, and negative electrode 203 may contain a sulfide solid electrolyte or oxide solid electrolyte for improved ionic conductivity or chemical stability/electrochemical stability. Sulfide solid electrolytes that can be used include electrolytes such as $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Oxide solid electrolytes that can be used include electrolytes such as NASICON solid electrolytes, typified by $LiTi_2(PO_4)_3$ and its substituted derivatives, $(LaLi)TiO_3$-based perovskite solid electrolytes, LISICON solid electrolytes, typified by $Li_{14}ZnGe_4O_{16}$, $Li_4SiO_4$, $LiGeO_4$, and their substituted derivatives, garnet-based solid electrolytes, typified by $Li_7La_3Zr_2O_{12}$ and its substituted derivatives, $Li_3N$ and its H-substituted derivatives, and $Li_3PO_4$ and its N-substituted derivatives.

At least one of the positive electrode 201, electrolyte layer 202, and negative electrode 203 may contain an organic polymer solid electrolyte for improved ionic conductivity. An organic polymer solid electrolyte can be, for example, a compound of a polymer and at least one lithium salt. The polymer may have the ethylene oxide structure. By having the ethylene oxide structure, the polymer can accommodate more of the lithium salt, thereby helping further increase ionic conductivity. Lithium salts that can be used include, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt can be one lithium salt selected from these and used alone. Alternatively, the lithium salt can be a mixture of two or more lithium salts selected from these.

At least one of the positive electrode 201, electrolyte layer 202, and negative electrode 203 may contain a nonaqueous liquid electrolyte, gel electrolyte, or ionic liquid for easier exchange of lithium ions and improved output characteristics of the battery.

A nonaqueous liquid electrolyte contains at least one nonaqueous solvent and at least one lithium salt dissolved in the nonaqueous solvent. Nonaqueous solvents that can be used include solvents such as cyclic carbonate solvents, linear carbonate solvents, cyclic ether solvents, linear ether solvents, cyclic ester solvents, linear ester solvents, and fluorinated solvents. Examples of cyclic carbonate solvents include solvents such as ethylene carbonate, propylene carbonate, and butylene carbonate. Examples of linear carbonate solvents include solvents such as dimethyl carbonate, ethyl methyl carbonate, and diethyl carbonate. Examples of cyclic ether solvents include solvents such as tetrahydrofuran, 1,4-dioxane, and 1,3-dioxolane. Linear ether solvents include solvents such as 1,2-dimethoxyethane and 1,2-diethoxyethane. Examples of cyclic ester solvents include solvents such as γ-butyrolactone. Examples of linear ester solvents include solvents such as methyl acetate. Examples of fluorinated solvents include solvents such as fluoroethylene carbonate, methyl fluoropropionate, fluorobenzene, fluoroethyl methyl carbonate, and fluorodimethylene carbonate. The nonaqueous solvent can be one nonaqueous solvent selected from these and used alone. Alternatively, the nonaqueous solvent can be a combination of two or more nonaqueous solvents selected from these. The nonaqueous liquid electrolyte may contain at least one fluorinated solvent selected from the group consisting of fluoroethylene carbonate, methyl fluoropropionate, fluorobenzene, fluoroethyl methyl carbonate, and fluorodimethylene carbonate. Lithium salts that can be used include, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt can be one lithium salt selected from these and used alone. Alternatively, the lithium salt can be a mixture of two or more lithium salts selected from these. The concentration of the lithium salt is in the range of, for example, 0.5 to 2 mol/liter.

A gel electrolyte can be a polymer material soaked with a nonaqueous liquid electrolyte. The polymer material may be, for example, polyethylene oxide, polyacrylonitrile, polyvinylidene fluoride, polymethyl methacrylate, or a polymer having ethylene oxide bonds.

As a component of an ionic liquid, a cation may be, for example, a quaternary salt having aliphatic chains, such as a tetraalkylammonium or tetraalkylphosphonium, an ammonium having an aliphatic ring, such as a pyrrolidinium, morpholinium, imidazolinium, tetrahydropyridinium, piperazinium, or piperidinium, or a nitrogen-containing heterocyclic aromatic cation, such as a pyridinium or imidazolium. As a component of an ionic liquid, an anion may be, for example, $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. An ionic liquid may contain a lithium salt.

At least one of the positive electrode 201, electrolyte layer 202, and negative electrode 203 may contain a binder for improved adhesion between particles. The binder is used to improve the binding together of the materials forming the electrode(s). Examples of binders include materials such as polyvinylidene fluoride, polytetrafluoroethylene, polyethylene, polypropylene, aramid resins, polyamides, polyimides, polyimide-imides, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyethers, polyethersulfones, hexafluoropolypropylene, styrene-butadiene rubber, and carboxymethyl cellulose. A binder, furthermore, can be a copolymer of two or more materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. It may also be that a mixture of two or more materials selected from these is used as a binder.

At least one of the positive electrode 201 and negative electrode 203 may optionally contain a conductive agent.

The conductive agent is used to reduce the electrical resistance of the electrode(s). Examples of conductive agents include materials such as types of graphite, which are natural graphite or artificial graphite, carbon blacks, such as acetylene black and Ketjenblack, conductive fibers, such as carbon fiber and metallic fiber, metallic powders, for example of fluorinated carbon or aluminum, conductive whiskers, for example of zinc oxide or potassium titanate, conductive metal oxides, such as titanium oxide, and conductive polymers, such as polyaniline, polypyrrole, and polythiophene. The use of a carbon conductive agent as a conductive agent is a measure for cost reduction.

Batteries according to Embodiment 3 can be configured as batteries in various shapes, including coin-shaped, cylindrical, square, sheet-shaped, button-shaped, flat-plate, and multilayer.

EXAMPLES

In the following, the details of the present disclosure are described using examples and comparative examples.

Example 1

Production of a Solid Electrolyte Material

In an argon atmosphere with a dew point of −60° C. or lower, 700.2 mg of LiBr, 769.2 mg of $YBr_3$, and 64.3 mg of $SrBr_2$ were weighed out and mixed together. The mixture was then milled at 600 rpm for 12 hours using a planetary ball mill.

Analysis of the Crystal Structure

Figure 2:
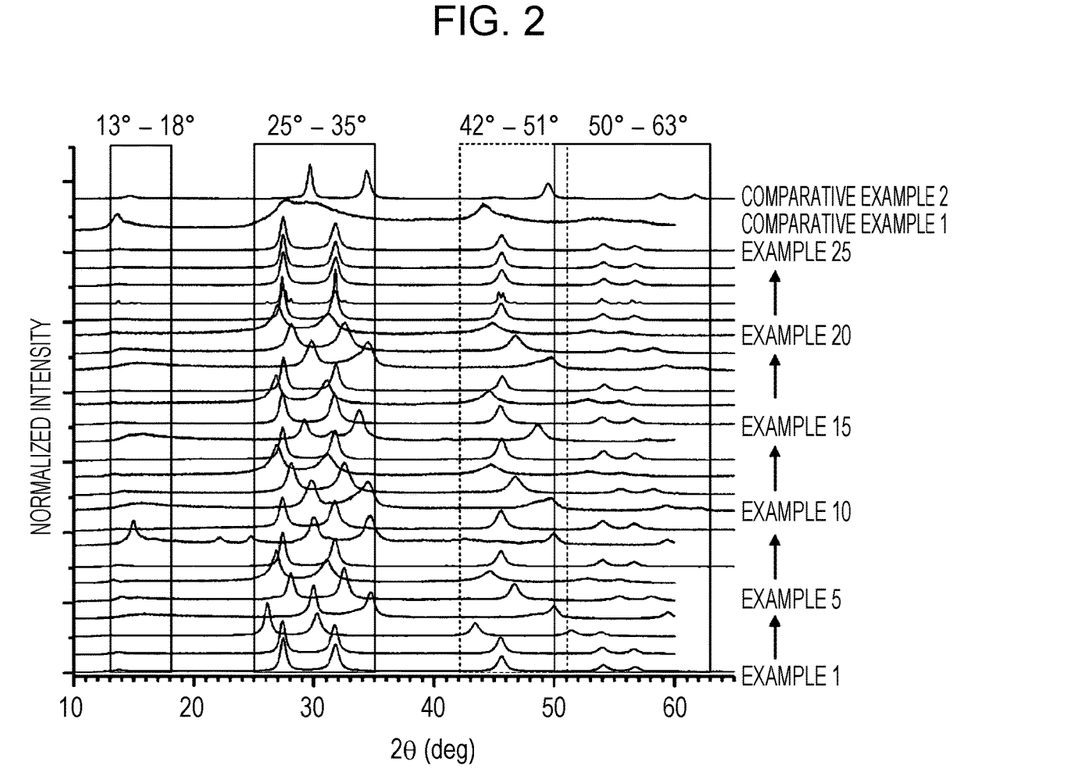
FIG. 2 is a diagram illustrating peak patterns in XRD.

FIG. 2 is a graph illustrating XRD patterns.

The results presented in FIG. 2 were measured by the following method.

That is, the analysis of the crystal structure of the solid electrolyte was done by measuring the X-ray diffraction pattern in a dry environment with a dew point of −45° C. or lower using an X-ray diffractometer (MiniFlex 600, RIGAKU). The X-ray source was Cu-Kα radiation. In other words, X-ray diffraction was measured by the θ-2θ method using Cu-Kα radiation (wavelengths, 1.5405 Å and 1.5444 Å) as X-rays.

The X-ray diffraction pattern in Example 1 exhibited relatively strong peaks at 13.82°, 27.46°, 31.78°, 45.6°, 54.1°, and 56.72°.

These peaks were substantially consistent with some peak positions in the X-ray diffraction diagram from an LEB phase.

Figure 3:
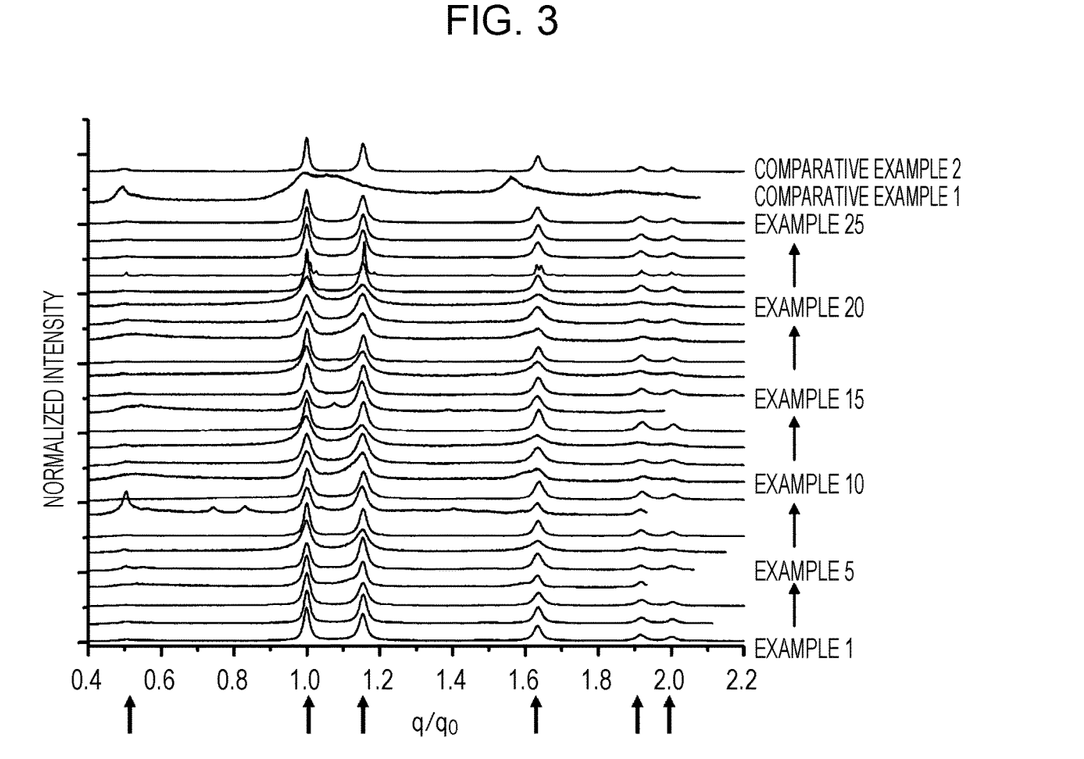
FIG. 3 is a diagram illustrating converted patterns.

The horizontal axis 2θ of the XRD pattern was changed to $q=4\pi \sin(\theta)/\lambda$, and q was normalized by $q_0=1.935$ Å$^{-1}$, the q at one of the peak positions, 2θ=27.46°. FIG. 3 is a diffraction diagram obtained when the normalized $q/q_0$ was taken as the horizontal axis. In FIG. 3, peaks were observed at the points at which $q/q_0$=0.507, 1.00, 1.154, 1.633, 1.916, and 2.001. These peak positions are indicated by the arrows in FIG. 3.

Testing for Lithium Ion Conductivity

Figure 4:
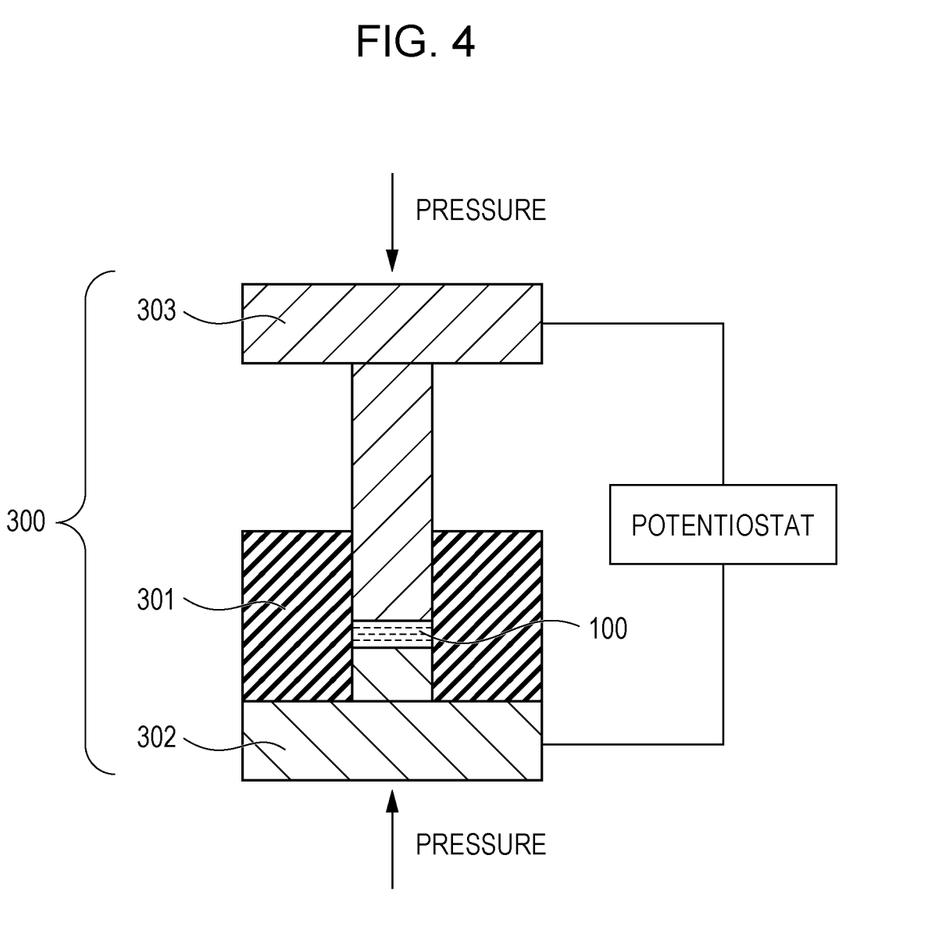
FIG. 4 is a schematic diagram illustrating a method for testing for ionic conductivity.

FIG. 4 is a schematic diagram illustrating a method for testing for ionic conductivity.

A compression molding die 300 is composed of an electronically insulating polycarbonate frame 301 and electronically conductive stainless-steel upper punch 303 and lower punch 302.

Using the setup illustrated in FIG. 4, the material was tested for ionic conductivity by the following method.

A powder of the solid electrolyte material in Example 1 was loaded into the compression molding die 300 in a dry atmosphere with a dew point of −30° C. or lower. The loaded powder was uniaxially compressed at 400 MPa, giving a conductivity measurement cell in Example 1.

With the cell being compressed, two lead wires, one from the upper punch 303 and the other from the lower punch 302, were handled to be connected to a potentiostat equipped with a frequency response analyzer (VersaSTAT 4, Princeton Applied Research), and the ionic conductivity at room temperature was measured by electrochemical impedance spectroscopy.

Figure 5:
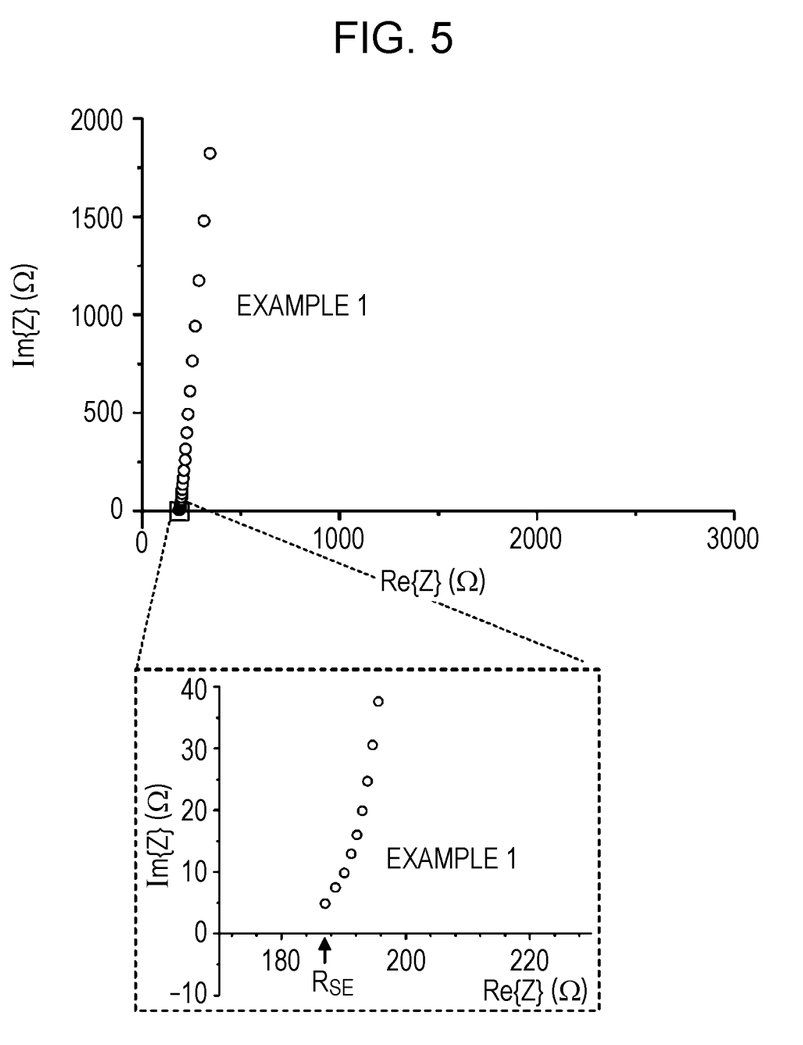
FIG. 5 is a graph illustrating the results of a test for ionic conductivity by AC impedance spectroscopy.

A Cole-Cole diagram for the results of the impedance spectroscopy is presented in FIG. 5.

In FIG. 5, the real impedance at the measuring point at which the absolute phase of the complex impedance is the smallest (arrow in FIG. 5) was deemed to be the resistance of the solid electrolyte in Example 1 to ionic conduction.

Using the resistance of the electrolyte, ionic conductivity was calculated by the equation below.

$$\sigma=(R_{SE} \times S/t)^{-1}$$

where σ is ionic conductivity, S is the area of the electrolyte (the inner diameter of the frame 301 in FIG. 4), $R_{SE}$ is the resistance of the solid electrolyte from the impedance measurement, and t is the thickness of the electrolyte (the thickness of the compact of multiple solid electrolyte particles 100 in FIG. 4).

The ionic conductivity, measured at 22° C., of the solid electrolyte material in Example 1 was 5.2×10$^{-4}$ S/cm.

Fabrication of a Secondary Battery

The solid electrolyte material in Example 1 and $LiCoO_2$ as an active material were weighed out in a ratio by volume of 70:30 in an argon glove box. These were mixed in an agate mortar, giving a mixture.

An amount of the solid electrolyte material in Example 1 equivalent to a thickness of 700 μm, 8.54 mg of the mixture, and 14.7 mg of Al powder were layered in this order in an insulating casing cylinder. This was subjected to compression molding at a pressure of 300 MPa, giving a first electrode and a solid electrolyte layer.

Then a layer of metallic In (200 μm thick) was placed on the side of the solid electrolyte layer opposite the side touching the first electrode. This was subjected to compression molding at a pressure of 80 MPa, giving a multilayer body formed by a first electrode, a solid electrolyte layer, and a second electrolyte.

Then a stainless-steel current collector was placed on the top and bottom of the multilayer body, and current collection lead wires were attached to the current collectors.

Lastly, the inside of the insulating casing cylinder was isolated from the external atmosphere and sealed using insulating ferrules.

In this way, a secondary battery in Example 1 was fabricated.

Charge and Discharge Test

Figure 6:
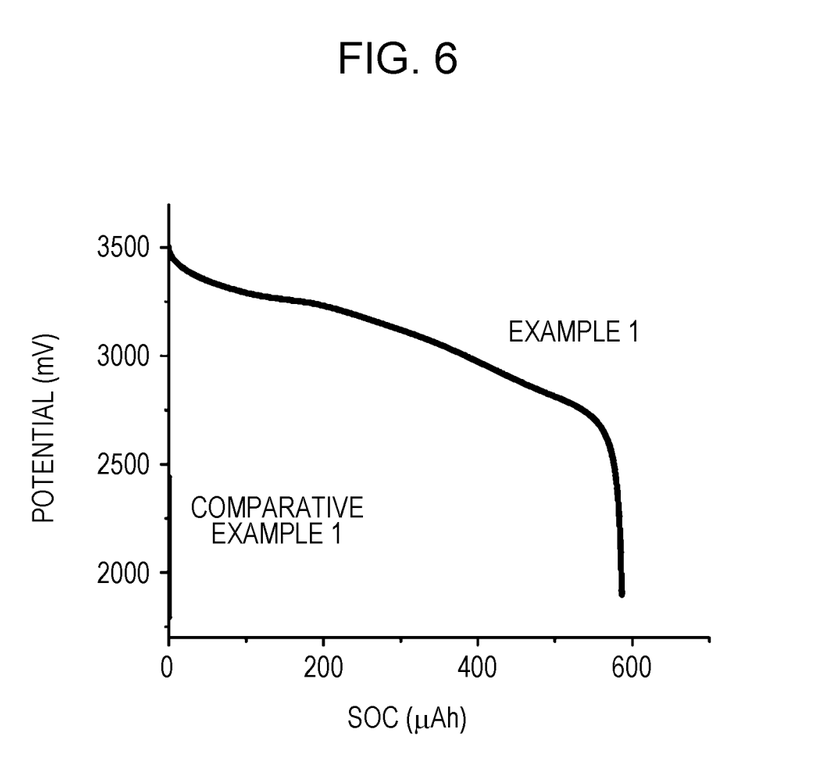
FIG. 6 is a graph illustrating initial discharge characteristics.

FIG. 6 is a graph illustrating initial discharge characteristics.

The results presented in FIG. 6 were measured by the following method.

That is, the secondary battery in Example 1 was placed in a thermostatic chamber at 25° C.

The battery was charged at a constant current that would be a C-rate of 0.05 C (20-hour rate) relative to the theoretical capacity of the battery, and charging was ended at a voltage of 3.6 V.

Then the battery was discharged at the same current, which would be a C-rate of 0.05 C, and discharging was ended at a voltage of 1.9 V.

From this measurement, the initial discharge capacity of the secondary battery in Example 1 was 586 μAh.

Examples 2 to 25

The following describes the synthesis and testing methods in Examples 2 to 25.

Production of a Solid Electrolyte Material

In Examples 2 to 25, raw-material powders were weighed out in a glove box the inside of which can be kept to be a dry and low-oxygen atmosphere with a dew point of −60° C. or lower and an oxygen concentration of 5 ppm or less. The proportions in each of Examples 2 to 25 are presented in Table 1 below.

Except for these, the same method as in Example 1 above was followed to produce a solid electrolyte material in each of Examples 2 to 25.

Analysis of the Crystal Structure

The crystal structure of the solid electrolyte material in each of Examples 2 to 25 was measured in the same way as in Example 1 above.

The X-ray diffraction diagrams in Examples 2 to 25 are presented in FIG. 2. The 2θ values at which peaks were observed are listed in Table 2 below.

As in Example 1, the horizontal axis 2θ of the X-ray diffraction diagram in FIG. 2 was changed to $q=4\pi \sin(\theta)/\lambda$, and, when the q for the peak on the lower-angle side of the two strong peaks present within the range in which 2θ=25° to 35° is defined as $q_0$, q was normalized by $q_0$. Diffraction diagrams obtained when the normalized $q/q_0$ was taken as the horizontal axis (=converted patterns) are presented in FIG. 3. The $q/q_0$ values at which peaks were observed are listed in Table 3 below.

For the solid electrolyte material in each of Examples 2 to 25, the X-ray diffraction pattern obtained was analyzed. In all of Examples 2 to 25, the anion sublattice was as in the LEB system, in which the anion sublattice is a distorted cubic closest packing, or as in spinel structures, in which the anion sublattice is cubic closest packing.

Testing for Lithium Ion Conductivity

A conductivity measurement cell in each of Examples 2 to 25 was fabricated as in Example 1 above in a glove box the inside of which can be kept to be a dry and low-oxygen atmosphere with a dew point of −90° C. or lower and an oxygen concentration of 5 ppm or less.

Except for this, the same method as in Example 1 above was followed to measure ionic conductivity.

The ionic conductivity in Examples 2 to 25 above is presented in Tables 2 and 3 below.

Fabrication of a Secondary Battery

The solid electrolyte material in each of Examples 2 to 25 and $LiCoO_2$ as a positive electrode active material were weighed out in a ratio by volume of 30:70 in a glove box the inside of which can be kept to be a dry and low-oxygen atmosphere with a dew point of −90° C. or lower and an oxygen concentration of 5 ppm or less. These were mixed in an agate mortar, giving a positive electrode mixture in each of Examples 2 to 25.

Except for these, the same method as in Example 1 above was followed to fabricate a secondary battery in each of Examples 2 to 25.

Charge and Discharge Test

The secondary battery in each of Examples 2 to 25 was subjected to a charge and discharge test in the same way as in Example 1 above. The initial discharge characteristics in Examples 2 to 25 were similar to those in Example 1; good charge and discharge characteristics were achieved.

Comparative Example 1

The raw-material powders for the solid electrolyte were 79.0 mg of LiBr, 696.3 mg of $YBr_3$, and 224.8 mg of $SrBr_2$.

Except for this, the same method as in Example 1 above was followed to perform the synthesis, testing, and analysis of each material.

The ionic conductivity, measured at 22° C., was lower than $1\times10^{-8}$ S/cm.

From the X-ray diffraction diagram, two distinctive peaks were not observed within the range of 25° or more and 35° or less; only a very broad peak was observed.

Comparative Example 2

The raw-material powders for the solid electrolyte were 1008.1 mg of LiCl and 1131.2 mg of $MgCl_2$.

Except for this, the same method as in Example 1 above was followed to perform the synthesis, testing, and analysis of each material.

The ionic conductivity, measured at 22° C., was $1\times10^{-6}$ S/cm.

The X-ray diffraction diagram is presented in FIG. 2. The 2θ values at which peaks were observed are listed in Table 2 below.

As in Example 1, the horizontal axis 2θ was changed to $q=4\pi \sin(\theta)/\lambda$, and, when the q for the peak on the lower-angle side of the two strong peaks present within the range in which 2θ=25° to 35° is defined as $q_0$, q was normalized by $q_0$. A diffraction diagram obtained when the normalized $q/q_0$ was taken as the horizontal axis is presented in FIG. 3. The $q/q_0$ values at which peaks were observed are listed in Table 3 below.

An analysis of the X-ray diffraction diagram revealed that the anion sublattice in Comparative Example 2 is cubic closest packing; the anion sublattice is as in spinel structures.

The configurations and test results in Examples 1 to 25 and Comparative Examples 1 and 2 above are presented in Tables 1 to 3.

TABLE 1

| | Constitutive elements | | | Li source | | Y source | | M source | |
|---|---|---|---|---|---|---|---|---|---|
| | Li, Y | M | X | Chemical formula | Proportion | Chemical formula | Proportion | Chemical formula | Proportion |
| Example 1 | Li, Y | Sr | Br | LiBr | 0.457 | YBr3 | 0.502 | SrBr2 | 0.042 |
| Example 2 | Li, Y | Sr | Br | LiBr | 0.485 | YBr3 | 0.389 | SrBr2 | 0.126 |
| Example 3 | Li, Y | Bi | Br, I | LiI | 0.561 | YBr3 | 0.436 | BiBr3 | 0.003 |
| Example 4 | Li, Y | Bi | Cl | LiCl | 0.671 | YCl3 | 0.326 | BiCl3 | 0.003 |
| Example 5 | Li, Y | Bi | Cl, Br | LiBr | 0.582 | YCl3 | 0.414 | BiCl3 | 0.004 |
| Example 6 | Li, Y | Bi | Cl, Br, I | LiI | 0.454 | YBr3 | 0.175 | BiBr3 | 0.001 |
| | | | | LiBr | 0.147 | YCl3 | 0.222 | | |
| Example 7 | Li, Y | Ca | Br | LiBr | 0.460 | YBr3 | 0.506 | CaBr2 | 0.034 |
| Example 8 | Li, Y | Ga | Cl | LiCl | 0.406 | YCl3 | 0.592 | GaCl3 | 0.003 |
| Example 9 | Li, Y | La | Br | LiBr | 0.407 | YBr3 | 0.531 | LaBr3 | 0.061 |
| Example 10 | Li, Y | Nb | Cl | LiCl | 0.538 | YCl3 | 0.430 | NbCl5 | 0.031 |
| Example 11 | Li, Y | Nb | Cl, Br | LiBr | 0.553 | YCl3 | 0.393 | NbCl5 | 0.030 |
| | | | | | | YBr3 | 0.024 | | |
| Example 12 | Li, Y | Nb | Cl, Br, I | LiBr | 0.132 | YCl3 | 0.192 | NbCl5 | 0.023 |
| | | | | LiI | 0.451 | YBr3 | 0.203 | | |
| Example 13 | Li, Y | Sc | Br | LiBr | 0.414 | YBr3 | 0.540 | ScBr3 | 0.047 |
| Example 14 | Li, Y | Sc | Cl | LiCl | 0.411 | YCl3 | 0.442 | ScCl3 | 0.147 |
| Example 15 | Li, Y | Sm | Br | LiBr | 0.428 | YBr3 | 0.379 | SmBr3 | 0.193 |
| Example 16 | Li, Y | Sm | Cl, Br, I | LiBr | 0.200 | YCl3 | 0.129 | SmBr3 | 0.129 |
| | | | | LiCl | 0.056 | YI3 | 0.310 | | |
| | | | | LiI | 0.176 | | | | |
| Example 17 | Li, Y | Sr | Br | LiBr | 0.471 | YBr3 | 0.445 | SrBr2 | 0.084 |
| Example 18 | Li, Y | Ta | Cl | LiCl | 0.518 | YCl3 | 0.400 | TaCl5 | 0.082 |
| Example 19 | Li, Y | Ta | Cl, Br | LiBr | 0.524 | YCl3 | 0.351 | TaCl5 | 0.077 |
| | | | | | | YBr3 | 0.047 | | |
| Example 20 | Li, Y | Ta | Cl, Br, I | LiBr | 0.115 | YBr3 | 0.218 | TaCl5 | 0.059 |
| | | | | LiI | 0.445 | YCl3 | 0.162 | | |
| Example 21 | Li, Y | Zr | Br | LiBr | 0.435 | YBr3 | 0.530 | ZrBr4 | 0.035 |
| Example 22 | Li, Y | Ca | Br | LiBr | 0.391 | YBr3 | 0.461 | CaBr2 | 0.148 |
| Example 23 | Li, Y | Ba | Br | LiBr | 0.453 | YBr3 | 0.497 | BaBr2 | 0.050 |
| Example 24 | Li, Y | Zn | Br | LiBr | 0.458 | YBr3 | 0.504 | ZnBr2 | 0.038 |
| Example 25 | Li, Y | Mg | Br | LiBr | 0.461 | YBr3 | 0.507 | MgBr2 | 0.032 |
| Comparative Example 1 | Li, Y | Sr | Br | LiBr | 0.079 | YBr3 | 0.696 | SrBr2 | 0.225 |
| Comparative Example 2 | Li | Mg | Cl | LiCl | 0.471 | | | MgCl2 | 0.529 |

TABLE 2

| | Li, Y | M | X | Conductivity (S/cm) | Positions of XRD peaks (2θ, deg) | | | | | |
|---|---|---|---|---|---|---|---|---|---|---|
| Example 1 | Li, Y | Sr | Br | 5.2E−04 | 13.82 | 27.46 | 31.78 | 45.6 | 54.1 | 56.72 |
| Example 2 | Li, Y | Sr | Br | 3.2E−04 | 13.8 | 27.44 | 31.8 | 45.62 | 54.08 | 56.7 |
| Example 3 | Li, Y | Bi | Br, I | 6.0E−04 | 13.12 | 26.14 | 30.28 | 43.46 | 51.38 | 53.92 |
| Example 4 | Li, Y | Bi | Cl | 5.0E−04 | 15.84 | 29.98 | 34.70 | 50.00 | 59.42 | |
| Example 5 | Li, Y | Bi | Cl, Br | 1.3E−03 | 14.06 | 28.08 | 32.48 | 46.66 | 55.46 | 58.08 |
| Example 6 | Li, Y | Bi | Cl, Br, I | 3.0E−03 | 13.38 | 26.88 | 31.04 | 44.60 | 52.74 | 55.52 |
| Example 7 | Li, Y | Ca | Br | 5.4E−04 | 13.78 | 27.40 | 31.72 | 45.52 | 54.02 | 56.64 |
| Example 8 | Li, Y | Ga | Cl | 4.0E−04 | 15 | 29.98 | 34.7 | 49.98 | 59.38 | |
| Example 9 | Li, Y | La | Br | 5.5E−04 | 13.76 | 27.36 | 31.72 | 45.62 | 54.00 | 56.64 |
| Example 10 | Li, Y | Nb | Cl | 1.1E−04 | 15.66 | 29.80 | 34.52 | 49.66 | 59.42 | 62.02 |
| Example 11 | Li, Y | Nb | Cl, Br | 7.2E−04 | 14.22 | 28.12 | 32.52 | 46.80 | 55.48 | 58.22 |
| Example 12 | Li, Y | Nb | Cl, Br, I | 2.1E−03 | 13.34 | 26.98 | 31.08 | 44.74 | 52.78 | 55.52 |
| Example 13 | Li, Y | Sc | Br | 4.8E−04 | 14.00 | 27.40 | 31.78 | 45.60 | 54.10 | 56.68 |
| Example 14 | Li, Y | Sc | Cl | 5.0E−04 | 15.78 | 29.22 | 33.78 | 48.66 | 57.64 | |
| Example 15 | Li, Y | Sm | Br | 7.6E−04 | 13.60 | 27.36 | 31.70 | 45.50 | 53.98 | 56.60 |
| Example 16 | Li, Y | Sm | Cl, Br, I | 3.0E−03 | 13.24 | 26.86 | 31.10 | 44.58 | 52.76 | 55.50 |
| Example 17 | Li, Y | Sr | Br | 3.0E−04 | 13.84 | 27.46 | 31.82 | 45.70 | 54.22 | 56.76 |
| Example 18 | Li, Y | Ta | Cl | 1.2E−04 | 15.68 | 29.80 | 34.52 | 49.72 | 59.32 | 62.02 |
| Example 19 | Li, Y | Ta | Cl, Br | 6.4E−04 | 14.18 | 28.14 | 32.54 | 46.80 | 55.58 | 58.24 |
| Example 20 | Li, Y | Ta | Cl, Br, I | 1.8E−03 | 13.66 | 26.98 | 31.20 | 44.88 | 53.06 | 55.72 |
| Example 21 | Li, Y | Zr | Br | 5.1E−04 | 13.64 | 27.42 | 31.74 | 45.62 | 54.08 | 56.66 |
| Example 22 | Li, Y | Ca | Br | 1.6E−03 | 13.72 | 27.36 | 31.78 | 45.38 | 53.94 | 56.44 |
| Example 23 | Li, Y | Ba | Br | 5.4E−04 | 13.78 | 27.46 | 31.78 | 45.66 | 54.08 | 56.74 |
| Example 24 | Li, Y | Zn | Br | 6.5E−04 | 13.78 | 27.44 | 31.78 | 45.62 | 54.16 | 56.72 |
| Example 25 | Li, Y | Mg | Br | 4.3E−04 | 13.8 | 27.44 | 31.8 | 45.62 | 54.08 | 56.7 |
| Comparative Example 1 | Li, Y | Sr | Br | <1e−8 | 13.62 | 27.84 | None | 44.08 | 53.24 | 54.10 |

TABLE 2-continued

|  | Li, Y | M | X | Conductivity (S/cm) | Positions of XRD peaks (2θ, deg) | | | | |
| --- | --- | --- | --- | --- | --- | --- | --- | --- | --- |
| Comparative Example 2 | Li |  | Mg Cl | 1e−6 | 14.76 | 29.68 | 34.38 | 49.46 | 58.72 61.6 |

TABLE 3

|  | Li, Y | M | X | Conductivity (S/cm) | Positions of XRD peaks (q/q$_0$) | | | | | |
| --- | --- | --- | --- | --- | --- | --- | --- | --- | --- | --- |
| Example 1 | Li, Y | Sr | Br | 5.2E−04 | 0.507 | 1.000 | 1.154 | 1.633 | 1.916 | 2.001 |
| Example 2 | Li, Y | Sr | Br | 3.2E−04 | 0.507 | 1.000 | 1.155 | 1.635 | 1.917 | 2.002 |
| Example 3 | Li, Y | Bi | Br, I | 6.0E−04 | 0.505 | 1.000 | 1.155 | 1.637 | 1.917 | 2.005 |
| Example 4 | Li, Y | Bi | Cl | 5.0E−04 | 0.533 | 1.000 | 1.153 | 1.634 | 1.918 |  |
| Example 5 | Li, Y | Bi | Cl, Br | 1.3E−03 | 0.504 | 1.000 | 1.153 | 1.632 | 1.918 | 2.001 |
| Example 6 | Li, Y | Bi | Cl, Br, I | 3.0E−03 | 0.501 | 1.000 | 1.151 | 1.633 | 1.911 | 2.004 |
| Example 7 | Li, Y | Ca | Br | 5.4E−04 | 0.507 | 1.000 | 1.154 | 1.633 | 1.918 | 2.003 |
| Example 8 | Li, Y | Ga | Cl | 4.0E−04 | 0.505 | 1.000 | 1.153 | 1.633 | 1.915 |  |
| Example 9 | Li, Y | La | Br | 5.5E−04 | 0.506 | 1.000 | 1.156 | 1.639 | 1.920 | 2.006 |
| Example 10 | Li, Y | Nb | Cl | 1.1E−04 | 0.530 | 1.000 | 1.154 | 1.633 | 1.927 | 2.004 |
| Example 11 | Li, Y | Nb | Cl, Br | 7.2E−04 | 0.509 | 1.000 | 1.153 | 1.635 | 1.916 | 2.003 |
| Example 12 | Li, Y | Nb | Cl, Br, I | 2.1E−03 | 0.498 | 1.000 | 1.148 | 1.631 | 1.905 | 1.997 |
| Example 13 | Li, Y | Sc | Br | 4.8E−04 | 0.515 | 1.000 | 1.156 | 1.636 | 1.920 | 2.004 |
| Example 14 | Li, Y | Sc | Cl | 5.0E−04 | 0.544 | 1.000 | 1.152 | 1.633 | 1.911 |  |
| Example 15 | Li, Y | Sm | Br | 7.6E−04 | 0.501 | 1.000 | 1.155 | 1.635 | 1.919 | 2.005 |
| Example 16 | Li, Y | Sm | Cl, Br, I | 3.0E−03 | 0.496 | 1.000 | 1.154 | 1.633 | 1.913 | 2.005 |
| Example 17 | Li, Y | Sr | Br | 3.0E−04 | 0.508 | 1.000 | 1.155 | 1.636 | 1.920 | 2.003 |
| Example 18 | Li, Y | Ta | Cl | 1.2E−04 | 0.530 | 1.000 | 1.154 | 1.635 | 1.925 | 2.004 |
| Example 19 | Li, Y | Ta | Cl, Br | 6.4E−04 | 0.508 | 1.000 | 1.152 | 1.634 | 1.918 | 2.002 |
| Example 20 | Li, Y | Ta | Cl, Br, I | 1.8E−03 | 0.510 | 1.000 | 1.153 | 1.636 | 1.915 | 2.003 |
| Example 21 | Li, Y | Zr | Br | 5.1E−04 | 0.501 | 1.000 | 1.154 | 1.636 | 1.918 | 2.002 |
| Example 22 | Li, Y | Ca | Br | 1.6E−03 | 0.505 | 1.000 | 1.158 | 1.631 | 1.918 | 1.999 |
| Example 23 | Li, Y | Ba | Br | 5.4E−04 | 0.505 | 1.000 | 1.154 | 1.635 | 1.915 | 2.002 |
| Example 24 | Li, Y | Zn | Br | 6.5E−04 | 0.506 | 1.000 | 1.154 | 1.635 | 1.919 | 2.003 |
| Example 25 | Li, Y | Mg | Br | 4.3E−04 | 0.507 | 1.000 | 1.155 | 1.635 | 1.917 | 2.002 |
| Comparative Example 1 | Li, Y | Sr | Br | <1e−8 | 0.493 | 1.000 | None | 1.560 | 1.863 | 1.890 |
| Comparative Example 2 | Li |  | Mg Cl | 1e−6 | 0.502 | 1.000 | 1.154 | 1.633 | 1.914 | 1.999 |

Discussion

As can be seen, Examples 1 to 25, compared with Comparative Examples 1 and 2, exhibit a high ionic conductivity of not less than 1×10$^{-4}$ S/cm near room temperature.

When Examples 1 and 2 and Comparative Example 1 are compared, it is found that these solid electrolyte materials have different crystal structures despite the same combination of constitutive elements: Li, Y, Sr, and Br. Whereas the X-ray diffraction diagrams in Examples 1 and 2 exhibit one or more peaks within the range of 13° or more and 18° or less, two or more distinctive peaks within the range of 25° or more and 35° or less, one or more peaks within the range of 43° or more and 51° or less, and two or more peaks within the range of 50° or more and 63° or less, that in Comparative Example 1 does not have two or more distinctive peaks within the range of 25° or more and 35° or less. The difference in crystal structure is more evident in the diffraction diagrams presented in Table 3 or FIG. 3, in which the horizontal axis is a normalized scattering vector q/q$_0$. That is, in Examples 1 and 2, peaks are observed at the points at which q/q$_0$=0.51, 1.00, 1.15, 1.64, 1.92, and 2.00 when q$_0$, for the peak within the range of 25° or more and 35° or less, is used as the reference point. In Comparative Example 1, peaks are observed at different points, indicating a difference in crystal structure.

When Examples 1 to 25 and Comparative Example 2 are compared, the relative positions of diffraction peaks are similar, indicating these solid electrolyte materials have similar crystal structures in terms of crystal structure. These materials, however, are constituted of different elements.

Examples 1 to 25, moreover, are remarkably conductive in comparison with Li$_3$YCl$_6$, in NPL 1, and Li$_3$YBr$_6$, in NPL 2, which did not conduct ions at room temperature.

A solid electrolyte material, therefore, exhibits a high ionic conductivity of 1×10$^{-4}$ S/cm or more if its constitutive elements are Li, Y, M, and X, where M is one or two or more elements selected from the group consisting of Mg, Ca, Sr, Ba, Zn, Sc, La, Sm, Bi, Zr, Hf, Nb, and Ta, and X is one or two or more elements selected from the group consisting of Cl, Br, and I, and if its sufficiently strong X-ray diffraction pattern measured by the θ-2θ method using Cu-Kα radiation (wavelengths, 1.5405 Å and 1.5444 Å) as X-rays has one or more peaks within the range in which the diffraction angle 2θ is 13° or more and 18° or less, two or more distinctive peaks within the range in which 2θ is 25° or more and 35° or less, one or more peaks within the range in which 2θ is 43° or more and 51° or less, and two or more peaks within the range in which 2θ is 50° or more and 63° or less.

A solid electrolyte material, furthermore, exhibits a high ionic conductivity of 1×10$^{-4}$ S/cm or more if its diffraction diagram created by changing 2θ, which is commonly used as the horizontal axis in X-ray diffraction diagrams, to the scattering vector, defined as q=4π sin(θ)/λ, and taking normalized q/q$_0$, where q$_0$ is a peak present in the range in which q=1.76 Å$^{-1}$ to 2.18 Å$^{-1}$, as the horizontal axis exhibits peaks within the ranges in which q/q$_0$ is 0.49 or more and 0.56 or less, 1.14 or more and 1.17 or less, 1.625 or more and 1.645 or less, 1.88 or more and 1.94 or less, and 1.9 or more and 2.1 or less.

Additionally, in Examples 1 to 25, the battery was found to be capable of charging and discharging at room temperature throughout. In Comparative Examples 1 and 2, by contrast, the discharge capacity was almost nil, so that the battery did not operate. The materials in Examples 1 to 25, furthermore, produce no hydrogen sulfide because their constitutive elements do not include sulfur.

Overall, solid electrolyte materials according to the present disclosure are electrolyte materials that produce no hydrogen sulfide and, at the same time, are capable of good charging and discharging by virtue of being highly conductive to lithium ions.

What is claimed is:

1. A solid electrolyte material comprising:
   Li;
   Y;
   at least one selected from the group consisting of Mg, Ca, Sr, Ba, Zn, Sc, La, Sm, Bi, Zr, Hf, Nb, and Ta; and
   at least one selected from the group consisting of Cl, Br, and I, wherein:
   an X-ray diffraction pattern of the solid electrolyte material obtained by using Cu-Kα radiation as an X-ray source
   includes a plurality of peaks within a range in which a diffraction angle 2θ is 25° or more and 35° or less, and
   includes at least one peak within a range in which the diffraction angle 2θ is 43° or more and 51° or less.

2. The solid electrolyte material according to claim 1, wherein
   the X-ray diffraction pattern further includes two peaks within a range in which the diffraction angle 2θ is 50° or more and 63° or less.

3. The solid electrolyte material according to claim 1, wherein
   the X-ray diffraction pattern further includes a peak within a range in which the diffraction angle 2θ is 13° or more and 18° or less.

4. The solid electrolyte material according to claim 1, wherein:
   the solid electrolyte material contains a sublattice of the at least one selected from the group consisting of Cl, Br, and I; and
   the sublattice has a cubic close-packed or distorted cubic close-packed structure.

5. A battery comprising:
   a solid electrolyte material according to claim 1;
   a positive electrode;
   a negative electrode; and
   an electrolyte layer between the positive electrode and the negative electrode, wherein
   at least one selected from the group consisting of the positive electrode, the negative electrode, and the electrolyte layer contains the solid electrolyte material.

6. A solid electrolyte material comprising:
   Li;
   Y;
   at least one selected from the group consisting of Mg, Ca, Sr, Ba, Zn, Sc, La, Sm, Bi, Zr, Hf, Nb, and Ta; and
   at least one selected from the group consisting of Cl, Br, and I, wherein:
   a first converted pattern, which is obtained by measuring an X-ray diffraction pattern of the solid electrolyte material by using Cu-Kα radiation as an X-ray source and converting the X-ray diffraction pattern to change a horizontal axis of the X-ray diffraction pattern from a diffraction angle 2θ to q,
   where $q = 4\pi \sin \theta / \lambda$, where λ is a wavelength of the Cu-Kα radiation,
   includes a base peak within a range in which q is 1.76 Å$^{-1}$ or more and 2.18 Å$^{-1}$ or less;
   a second converted pattern, which is obtained by converting the X-ray diffraction pattern to change the horizontal axis of the X-ray diffraction pattern from the diffraction angle 2θ to q/q$_0$,
   where q$_0$ is a q corresponding to the base peak in the first converted pattern,
   includes a peak within each of a range in which q/q$_0$ is 1.14 or more and 1.17 or less and a range in which q/q$_0$ is 1.62 or more and 1.65 or less.

7. The solid electrolyte material according to claim 6, wherein
   the second converted pattern includes a peak within each of a range in which q/q$_0$ is 1.88 or more and 1.94 or less and a range in which q/q$_0$ is 1.9 or more and 2.1 or less.

8. The solid electrolyte material according to claim 6, wherein
   the second converted pattern includes a peak within a range in which q/q$_0$ is 0.49 or more and 0.56 or less.

9. The solid electrolyte material according to claim 6, wherein:
   the solid electrolyte material contains a sublattice of the at least one selected from the group consisting of Cl, Br, and I; and
   the sublattice has a cubic close-packed or distorted cubic close-packed structure.

10. A battery comprising:
    a solid electrolyte material according to claim 6;
    a positive electrode;
    a negative electrode; and
    an electrolyte layer between the positive electrode and the negative electrode, wherein
    at least one selected from the group consisting of the positive electrode, the negative electrode, and the electrolyte layer contains the solid electrolyte material.

* * * * *